United States Patent
Pugh et al.

(10) Patent No.: US 8,032,864 B2
(45) Date of Patent: *Oct. 4, 2011

(54) COMPUTER READABLE STORAGE MEDIUM FOR MULTI-LANGUAGE DEBUGGING

(75) Inventors: William A. Pugh, Seattle, WA (US); Joshua Moll Eckels, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 983 days.

This patent is subject to a terminal disclaimer.

(21) Appl. No.: 11/938,114

(22) Filed: Nov. 9, 2007

(65) Prior Publication Data

US 2008/0066059 A1 Mar. 13, 2008

Related U.S. Application Data

(63) Continuation of application No. 10/784,600, filed on Feb. 23, 2004, now Pat. No. 7,299,454.

(60) Provisional application No. 60/450,014, filed on Feb. 26, 2003.

(51) Int. Cl.
*G06F 9/44* (2006.01)

(52) U.S. Cl. .......... 717/125; 717/126; 717/127
(58) Field of Classification Search .......... 717/124–135
See application file for complete search history.

(56) References Cited

U.S. PATENT DOCUMENTS 6,353,923 B1 * 3/2002 Bogle et al. .......... 717/128
7,299,454 B2 * 11/2007 Pugh et al. .......... 717/125

* cited by examiner

*Primary Examiner* — Ted T Vo

(74) *Attorney, Agent, or Firm* — Squire, Sanders & Dempsey (US) LLP

(57) ABSTRACT

Software developers working on multi-language systems can utilize a multi-language debugging environment. The debugging environment can be uniform across languages, and can seamlessly perform debugging between one or more languages in a multi-language environment. Such a system can have a number of attributes intended to help developers facing debugging problems in multi-language environments. This description is not intended to be a complete description of, or limit the scope of, the invention. Other features, aspects, and objects of the invention can be obtained from a review of the specification, the figures, and the claims.

18 Claims, 1 Drawing Sheet

COMPUTER READABLE STORAGE MEDIUM FOR MULTI-LANGUAGE DEBUGGING

CLAIM OF PRIORITY

This application is a continuation of U.S. patent application Ser. No. 10/784,600 entitled "Method for Multi-Language Debugging," filed on Feb. 23, 2004 by William A. Pugh, et al., which claims priority to U.S. Provisional Application No. 60/450,014 entitled "Systems and Methods for Multi-Language Debugging," filed on Feb. 26, 2003, by William A. Pugh, et al., which applications are incorporated by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the debugging of software and software components.

BACKGROUND

Most real-world software systems of any significant complexity are written in more than one programming language. For example, an environment may be implemented in JAVA™ while an interpreted language may be running on top of JAVA™ and need to be debugged. This situation creates significant difficulties for software developers attempting to debug these systems. This problem is complicated by the fact that there is no standardization in terms of internal structures, such as stack frames, between different programming languages. For example, it is not uncommon for a developer to see stack information not directly related to the software being debugged when encountering a stack frame for one language, when using a debugger intended for another language. As another example, when using a debugger intended for the JAVA™ language, a JAVA™ stack will not include the stack for XScript (a JavaScript variant with native support for extensible markup language (XML)), and can sometimes show the set of Java classes that implement the XScript engine (these are part of the environment, but not the software the developer is working on). One multi-language debugger, described in JAVA™ Specification Request (JSR) 45, can only be used to debug languages that are easily transformed into Java and then compiled. This and most other multi-language debuggers won't work with languages such as XScript where the language will be run by an interpreter or the language can not be mapped directly to JAVA™ because the language has a different data structure. Thus, creating debugging tools that can be applied to software applied to more than one programming language, and running in the same environment, has proved to be extremely difficult.

SUMMARY OF THE INVENTION

Methods for a debugging environment that can be used by software developers working on multi-language systems. The techniques used create a debugging environment that can be uniform across languages, and can seamlessly perform debugging between one or more languages in a multi-language environment. Such a system can have a number of attributes intended to help developers facing debugging problems in multi-language environments.

DETAILED DESCRIPTION

Figure 1:
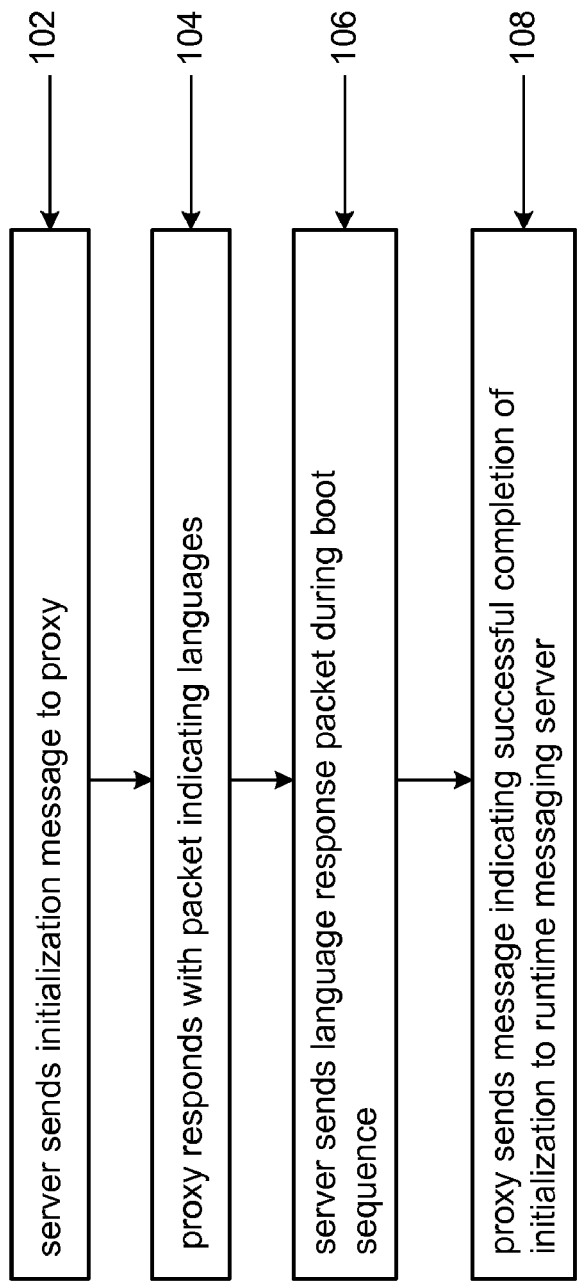
FIG. 1 describes an initialization process for one embodiment of the invention.

Systems and methods in accordance with embodiments of the present invention provide a debugging environment that can be used by software developers working on multi-language systems. The techniques used create a debugging environment that can be uniform across languages, and can seamlessly perform debugging between one or more languages in a multi-language environment. Such a system can have a number of attributes intended to help developers facing debugging problems in multi-language environments including:

Integrate debugging between two or more languages at the same time. If more than one language appears on a stack, a developer can see the frames for each language, as well as be able to inspect variables for each language.

Nested language debugging. A developer can debug source code that has several nested languages within a single source file. Mixing several languages in a single source file is becoming an increasingly valuable and popular capability. For example, the emerging ECMAScript for XML languages embeds the XML languages directly in ECMAScript.

An extensible architecture. Support for additional languages can be added to the multi-language debugging environment. For example, using multiple language definitions, a developer can perform debugging in the JAVA™ language, Xscript language, the Xquery language, and various Business Process Modeling languages, such as the Business Process Execution Language.

Each language integrated into a multi-language debugger can include specific support for the stack frame structures and variable representations used in that language. Each new language added to the multi-language debugger can extend the system in at least one of 3 areas:

The Integrated Development Environment (IDE). If the debugger is associated with an IDE, this environment can contain support for the languages supported by the debugger. These extensions may include appropriate APIs to get at dialog boxes (watch, locals, stack frame, etc), as well as the debugging commands. As an example, many Business Processes Modeling languages will simply be extensions in the IDE that will map to normal JAVA™ code, or code in some other complied or interpreted programming language. In these cases, the extensions may be able to simply create extensions to the IDE environment for the underling programming language.

The Proxy. In one embodiment of the present invention, the proxy is not required. When implemented, the proxy may be used to implement user interface (UI) commands into the underlying debugging framework requests. The proxy can be used in-process or out-of-process. In the case where a proxy is out-of-process and used as an intermediate between the environment the software is executing in and the debugger, a proxy with the correct mapping between the new language and the underling language may be used. For example, to add debugging for a new language that maps directly to JAVA™ byte codes, the proxy is extended to map between the new language and JAVA™.

Runtime messaging infrastructure. For some languages the debugger should be capable of interacting with the messaging infrastructure. For example, to debug an interpreted language, like Xscript, the debugging may be done on the server side of the messaging infrastructure. In one embodiment, the Runtime messaging infrastructure may interpret language interactions and perform debugging in JAVA™ Platform Debugging Architecture (JPDA).

Throughout the following discussion, an example is developed using the JAVA™ language. It will be understood that the invention is equally applicable to any programming language. This example is presented for illustrative purposes only and is not meant to limit the scope, functionality or spirit of any particular embodiment of the invention.

Architectural Overview

Some embodiments will be comprised of one or more functional components or modules. It will be understood that any particular embodiment of the invention may not require all of the components listed, may use additional components, or may use an entirely different organization without changing the functionality, scope or spirit. Components used in some embodiments can include:

A proxy—In some embodiments a proxy is used between the executing code being debugged and the debugger. In some cases, the proxy serves to improve the efficiency or reduce the overhead associated with debugging protocols. For example, many JAVA™ language debuggers use the JAVA™ Debugging Interface (JDI), which has a fine-grain API and therefore will create a lot of message traffic between the code under test and the debugger. In this case a proxy can consolidate the contents of some of the messages, potentially reducing messages and overhead.

A script engine interface—A script engine can communicate with the multi-language debugger through a standardized interface. This interface can be used by the multi-language debugger to communicate metadata to the proxy (or possibly directly to the debugger), so the proxy can determine when to call into which debuggable language. As an example, for multi-language support of JavaScript, a JAVA™ language debugger may define an interface, possibly called IdebuggableLanguage, which is used anytime the script engine is invoked. Typically there is an object in the JAVA™ stack that implements this interface, and can translate the JAVA™ stack into a JavaScript stack.

A debuggable frame—For each language supported, the scripting engine may use a debuggable frame object, capable of retrieving the script context. As an example, a JAVA™ language debugger may define such a standardized frame, possibly known as IdebuggableFrame.

An interface to the messaging environment—This is an interface that can be implemented by a runtime-messaging environment that controls the running state of the scripting engines. As an example, a JAVA™ language debugger may define a standardized interface, possibly known as IdebugScriptController.

Script context object—For each language supported, the scripting engine can use an object to hold a script context. As an example, a JAVA™ language debugger may define a standardized object, possibly known as IcontextHolder.

A debug commands interface—For each language supported, the script engine can use a standardized interface, which the multi-language debugger uses to call into the different debuggable languages. As an example, a JAVA™ language debugger may define a standardized object, possibly known as IDebugCommands.

A script debug controller—A script engine may have a static constructor that loads a script debug controller, which may registers itself upon start-up. When the script engine registers itself, the script debug controller may get the following information from the engine: a) the language extensions for each language, b) the classes that implement the script engine, c) information on optional capabilities for the language, and d) the language name. In some cases the controller may store this information internally in a map that goes from extension to script engine. As an example, for a JAVA™ language debugger the script debug controller, possibly known as ScriptDebugController, is defined in debugger.jar.

Process Overview

In some embodiments, when the runtime-messaging infrastructure is started in non-production (debug) mode, a script controller for the debug process is started. This object inspects the system for script engines, and loads them and their configuration information.

In some embodiments when the runtime-messaging infrastructure starts a debugging session, it will send a message to the proxy. Typically, this message includes a list of languages and language configuration information for the languages supported by the multi-language debugger. In some embodiments, when debugging begins, the debug proxy will talk to the script controller for control flow (e.g. step, continue, pause), and will operate directly on the script engines for debugging information (e.g. stack frames, variable inspection, expressions).

In some embodiments, after the script engines have all registered themselves, the script debug controller waits until debugging is started. This process is depicted in FIG. 1. Once debugging commences:

1. The server can send 102 an initialization message to the proxy.

2. The proxy can respond 104 with a packet indicating the languages discovered.

3. The server can send 106 a language response packet during the boot sequence. This packet may include the information used by the script debug controller, such as: a) the language extensions for each language, b) the classes that implement the script engine, c) information on optional capabilities for the language, and d) the language name.

4. The proxy will now send 108 a message indicating the successful completion of the initialization to the runtime messaging server, and will then wait for events.

Breakpoint Hits

In some embodiments, when a breakpoint is hit, or a step is finished in communications with the script engine will be to the script debug controller. As an example, with JAVA™ code, all communications with the script engines will be through JDI calls to the script debug controller.

For some embodiments, the first breakpoint hit in the underling language can behave like a normal break. The following process may then occur:

1. The debugger gets the current class, line, and stack and processes the stack through a language filter. If during processing, the debugger encounters a class that implements a script language the following steps may be take: a) if the object derives from a context holder, the debug script controller makes a method call to get the context, and b) the debug script controller will call a method to get the contents of the stack. Continuing the examples for the JAVA™ language, the debug script controller will call getcontext (or some other suitable named method) on the IcontextHolder object to get the context and then calls a method ScriptDebugController.getStack (LanguageExt, Context) (or some other suitable named method) via JDI, to get a list of scriptFrames.

2. All script languages are processed as described above, creating a stack frame list to send back to the debugger.

3. The debugger proceeds to discover and inspect variables in the same way as before.

Current Frame Set to Script Frame

In some embodiments, the following process may occur if the current stack frame is set to a frame controlled by a script engine:

1. Get the "this" object and the frame variables and send them to the client as the list of variables.
2. For each object queried, call a method to get the values of the script variables. Continuing the example for the JAVA™ language, a call is made to IDebuggableLanguage.getVariable( ) (or some other suitable named method), to get the IScriptVariable (or some other suitable named interface)value. Some possible Java language examples of the results of this operation can be seen in the following table.

cases, script implementation classes are placed into the excludes-filter during a step request.

Continuing

In some embodiments this operation behaves like a continue in an ordinary (not multi-language) debugger.

Script Breakpoint Hit

In some embodiments, when a script breakpoint is hit the following actions can occur:

The script controller will call a breakpoint method, sending a message indicating the breakpoint hit to the proxy. Continuing the JAVA™ language example, the controller can call into a method with a name, such as, ScriptDebugController.Break( ) to send the message to the proxy.

The Proxy can then freeze the thread, and perform any required communications. In the JAVA™ example these communications can use function calls via JDI.

When the user decides to continue, the debugger will unfreeze the thread and send a Continue, StepIn, StepOver, StepOut, etc., packet as appropriate.

In some embodiments, if the user hits Stop instead of Continue, the thread can be un-frozen, no network packet will be sent, and the thread may be forced to throw an exception used for killing threads. Alternatively, such actions by the user can be temporarily blocked.

Pause

In some embodiments, when the user hits Pause, the thread will be paused. The debugger can then look to see if the stack

| Value Type | Value Display | Type Display | If Expanded | In Expression |
|---|---|---|---|---|
| Simple | getValue( ) | getType( ) | — | Call getPrimativeType( ) to determine which get* function to call to get the correct value. |
| Complex | getValue( ) | Get Type ( ) | Call getMembers( ) to get the list of members to display, then call getMember( ) one each to get the values. | Use getMember to get members, and callMethod to call methods on the value. |
| Array | getValue( ) | getType( ) | Create a list getLength( ) long, and populate it with calls to getElement( ) | Use getElement to lookup the values |
| Other Language | Call into the ScriptDebug Controller to get a resolved ScriptValue and use that. | Call into the ScriptDebug Controller to get a resolved ScriptValue and use that. | Call into the ScriptDebugController to get a resolved ScriptValue and use that. | Call into the ScriptDebugController to get a resolved ScriptValue and use that. |
| Java | Call getValueObject and treat as ordinary Java Object | Call getValueObject and treat as ordinary Java Object | Call getValueObject and treat as ordinary Java Object | Call getValueObject and treat as ordinary Java Object |

Stepping Through Code

Some embodiments can step though code using a mechanism analogous to that used in an ordinary (without multi-language support) debugger, except that the debugger will inform the script debug controller when a step is about to begin. In this way, any script engine that is started, and script engines that return from calling into the underling language (e.g. JAVA™) will be able to stop appropriately. In some is currently in scripting or the underling language (e.g. JAVA™) code. One of the following actions may then be taken:

1. If the stack is in the underling language code, the process is complete. In some cases, this situation is treated in the same way hitting a breakpoint is treated.
2. If the stack is in script code, a pause method is called on the script engine interface and the execution of the scripting language will continue until it hits a stopping point, when a pause method is called on the script debug controller. Continuing the JAVA™ language example, when a pause( ) method on the IdebuggableLanguage interface is called, the scripting language will continue until it hits a stopping point, at which point the engine calls ScriptDebugController.Pause( ).

In some embodiments, when a pause is called on a script language while it is waiting on some synchronization object, it will be treated as a normal thread in the underling language (e.g. JAVA™), which can prevent deadlock scenarios.

Breakpoints

In some embodiments, information in breakpoint packets can use a suitable extension or other indicator to identify the language type being executed. In some cases, the absence of the extension can indicate the underling language (e.g. JAVA™) is being used. If a breakpoint is not in the underling language the following actions may be taken:
1. Send a message to the script debug controller telling it to set a breakpoint.
2. The script debug controller will look up the proper extension or indicator and set a breakpoint using the method available for that language.
3. The script debug controller will then send a message indicating the success or failure of setting the breakpoint.

In some embodiments several types of breakpoints are supported, which can include:

| | |
|---|---|
| Source Breakpoints | This is the ordinary type of breakpoint that goes on a source file/line number |
| Method Breakpoint | This breakpoint is hit when a certain method is called |
| Watch point | This breakpoint is hit when a variable is either read or written. |

It should be noted, that depending on the details of the embodiment, any language may be able to support a sub-set of the available breakpoint types for any given language. Returning a true or false to a query for that type can indicate the support for a particular breakpoint type. For example, a true or false can be returned for a method, featureEnabledo (or some other suitable name), when called with a variable indicating the break point type, such as, SOURCE_BREAKPOINT_SUPPORT, METHOD_BREAKPOINT_SUPPORT, or WATCH_POINT_SUPPORT

AN EXAMPLE

Interfaces

The following examples show sets of interface definitions for two embodiments, developed using the JAVA™ language. It will be understood that the invention is equally applicable to any programming language. This example is presented for illustrative purposes only and is not meant to limit the scope, functionality or spirit of any particular embodiment of the invention.

Interface Definition 1

```
/**
 * The script controller will be an object that
 interoperates with the scripting languages
 * to bring you script debugging. The way this will
 work is each language engine will have
 * an instance of the <code>IScriptController</code>,
 and the <code>IScriptController</code>
 * will have list of all the <code>IDebuggable
 Language</code> interfaces.
 */
public interface IScriptController
{
  static int RESUME_CONTINUE = 0;
  static int RESUME_STEP_IN = 1;
  static int RESUME_STEP_OUT = 2;
  static int RESUME_STEP_OVER = 3;
  static int RESUME_STOP = 4;
  /**
   * This is what a running script will call when it
     wants to break. This is a waiting call,
   * that will not return until the thread has been
     told to continue. The frames parameter should
   * be a list of <code>IDebuggable
     Language$IScriptFrame</code>.
   *
   * @param frames - should be the frame
     list for the current script context.
   *
   * @return the return value tells the scripting
     engine what command resumed the break.
   */
  public int Break( );
  /**
   * this is what the scripting lanuguage calls
     when it's time to pause itself.
   *
   * @return the return value tells the scripting
     engine what command resumed the pause.
   */
  public int Pause(int pauseID);
  /**
   * This is what a script engine must call
     when starting execution. This is how the
   * engine will know if the thread is currently
     in the middle of a step or not.
   *
   * @return the return value tells the scripting
     engine what kind of execution we are
   * in the middle of.
   */
  public int StartScript( );
  /**
   * This is what a script engine must call
     when resuming execution. This is how the
   * engine will know if the thread is currently
     in the middle of a step or not.
   *
   * @return the return value tells the scripting
     engine what kind of execution we are
   * in the middle of.
   */
  public int ResumeScript( );
  /**
   * processes the variable on script engine that
     created it. This will be called by a script engine that
   * needs to process an expression or a variable that
     was created in another script engine or in Java.
   */
  public IDebuggableLanguage.IScriptValue processScript
  Value(IDebuggableLanguage.IScriptValue value);
  /**
   * This tells the script controller that a breakpoint
     that was previously un-resolvable has
   * now been resolved.
   */
  public void breakpointProcessed
  (IDebuggableLanguage.IBreakpointInfo bpi);
  /**
   * This gets the stack frames for the script
     language specified, using the context specified.
   *
   * @param langExt -- This is the language extension
     for the language we are inspecting.
```

```
     * @param context -- This is the language context
     we are investigating.
     *
     * @return an array of the stackframes this yeilds.
     */
    IDebuggableLanguage.IScriptFrame[ ]
getStack(String langExt,Object context);
}
/**
    * This interface is used to get a context
      object for a given frame. The way this
    * will work is that the Proxy will go down
      the stack frame, looking for objects that
    * derive from IScriptContextHolder. When
      it comes across such a class, it will get the
    * context from the frame and pass it to the
      DebugScriptController. It is possible for
    * many script frames to all have the same
      context. In this case, the frame will only
    * get passed to the DebugScriptController once.
    */
public interface IScriptContextHolder
{
    {public Object getContext( );
}
/**
    *A scripting engine must implement
      this interface in order to be able to set itself up
    * to debug in the KNEX framework.
    *
    * NOTE: Kill will work the same way for script
      languages as it does for Java execution. An
    * exception will suddenly be thrown that
      should kill everything.
    *
    */
public interface IDebuggableLanguage
{
    //These are strings for each features
    public static String EXPRESSION_
    SUPPORT="weblogic.debugging.comm.expressions";
    public static String SOURCE_BREAKPOINT_
    SUPPORT="weblogic.debugging.comm.breakpoint";
    public static String
METHOD_BREAKPOINT_SUPPORT=
"weblogic.debugging,comm.methodbreakpoint";
    public static String WATCH_POINT_SUPPORT=
    "weblogic.debugging.comm.watchpoint";
    /**
        * This will be called on each of the debuggable
          languages before we get rolling.
        */
    public boolean init(IScriptController controller);
    /**
        * This will be called when we are ending.
        */
    public void exit( );
    /**
        * This is a list of the classes we should filter
          to prevent from showing up
        * in the stack. You will be able to use wild
          cards, such as org.mozilla.rhino.*
        */
    String[ ] LanguageFilters( );
    /**
        * This is a list of the class instances that we can
          call into to get variable information, etc.
        * When walking through a stack trace, we will go
          to each of these to ask it to spit out it's stack. We will
        * furthermore. When a user inspects this part of the stack,
          we will also ask these objects for variable
values, etc.
        */
    String[ ] LanguageFrames( );
    /**
        * This is a list of the class instances that we can
          call into to get variable information, etc.
        * When walking through a stack trace, we will go to
          each of these to ask it to spit out it's stack. We will
        * furthermore. When a user inspects this part of the
          stack, we will also ask these objects for variable
values, etc.
        */
    String LanguageName( );
    /**
        * This is a list of the class instances that we
          can call into to get variable information, etc.
        * When walking through a stack trace, we will go
          to each of these to ask it to spit out it's stack. We will
        * furthermore. When a user inspects this part of the
          stack, we will also ask these objects for variable
values, etc.
        */
    String[ ] LanguageExtensions( );
    /**
        *This function is used for determining what
          features this debug engine supports. (
        */
    boolean featureEnabled(String feature);
    /**
        * When pause is called, it is up to the script
          engine to break at the next possible
        * place. This method can be called while
          the engine is in teh middle of processing,
        * so should be treated as a synchronized.
        */
    void pause(Object context, int pauseID);
    //
    //Methods for Inspecting/dealing with variables
    IScriptValue getVariable(Object context,
    String strVar, int stackFrame);
    IScriptValue setVariable(Object context,
    String strVar, int stackFrame);
    IScriptValue processExpression(Object
    context, String strExpr, int stackFrame);
    //Method for inspecting the current stack
    IScriptFrame[ ] getStack(Object context);
    //Breakpoints
    IBreakpointInfo setBreakpoint(IScriptBreakpoint bp);
    void clearBreakpoint(IScriptBreakpoint bp);
    void clearAllBreakpoints( );
    public interface IScriptValue
    {
        static final int SIMPLE_TYPE = 0;
        static final int COMPLEX_TYPE = 1;
        static final int SCRIPT_ARRAY_TYPE = 2;
        static final int OTHER_LANGUAGE_TYPE = 3;
        static final int JAVA_LANGUAGE_TYPE = 4;
        /**
            * This gets the value we should display to the user.
            */
        String getValue( );
        /**
            * If this is a language that supports types, this
              should return the type name of this variable.
            */
        String getTypeName( );
        /**
            * This determines if the variable is a complex
              type, simple type or other languagy type.
            */
        int getAbstractType( );
    }
    public interface ISimpleScriptValue extends IScriptValue
    {
        public static final int TYPE_BOOLEAN = 0;
        public static final int TYPE_BYTE = 1;
        public static final int TYPE_CHAR = 2;
        public static final int TYPE_DOUBLE = 3;
        public static final int TYPE_FLOAT = 4;
        public static final int TYPE_INT = 5;
        public static final int TYPE_LONG = 6;
        public static final int TYPE_SHORT = 7;
        public static final int TYPE_STRING = 8;
        public static final int TYPE_NULL = 9;
        public int getPrimativeType( );
        public boolean getBoolean( );
        public byte getByte( );
        public char getChar( );
```

```
    public double getDouble( );
    public float getFloat( );
    public int getInt( );
    public long getLong( );
    public short getShort( );
    public short getString( );
}
public interface IScriptArrayValue extends IScriptValue
{
    int getLength( );
    IScriptValue getElement(int i);
}
public interface IComplexScriptValue extends IScriptValue
{
    /**
     * if this is a complex type, this will
        return a list of all it's members.
     */
    List getMembers( );
    /**
     * if this is a complex type, this will return a member of it.
     */
    IScriptValue getMember(String name);
    /**
     * calls a method on the comlex type. If
       the method is a void method, it should
     * return a null. Otherwise, callMethod should
       return a scriptValue representing the
     * returned value.If that value is null, this will
       be a ScriptValue with the value null.
     */
    IScriptValue callMethod(String name, IScriptValue[ ] values);
}
public interface IOtherLanguageValue extends IScriptValue
{
    /**
     * script extension for this variable.
     */
    String getScriptExtension( );
    /**
     * gets the underlying value object. The other
       scripting language should be able to figure out
     * what this is to be able to create one of the
       other Script values from this.
     */
    Object getValueObject( );
}
public interface IJavaValue extends IScriptValue
{
    /**
     * gets the underlying java object. The proxy will be
       able to disect this and keep values, etc for this.
     */
    Object getValueObject( );
}
public interface IScriptFrame
{
    /**
     * This will get the file extension specifying
       what language this is.
     * If a language supports more than one
       file extension, this will just be one.
     */
    String getLanguageExtension( );
    /**
     * If this returns non-null, this string will be used to display
     * the stack frame to the user.
     */
    String getDisplayFrame( );
    /**
     * This is the class name that we will derive
       the file from. This will be put through the
     * document resolution process on the ide.
     */
    String getClassName( );
    /**
     * This is the line of execution the current frame is on.
     */
    int getLine( );
    /**
     * This function will return an array of all the values
       visible from the current stack. All the
     * values in the list that are returned will be of
       type IScriptValue.
     */
    List getFrameVariables( );
    /**
     * This function will return an IScriptValue if there is
       a <code>this</code>object, otherwise it
     * will return null.
     */
    IScriptValue getThis( );
}
public interface IBreakpointInfo
{
    public static final String
    BREAKPOINT_RESOLVED = "0";
    public static final String
    BREAKPOINT_UNRESOLVED = "1";
    public static final String BREAKPOINT_ERROR = "2";
    public String getStatus( );
    public int getOrigLine( );
    public int getCurrLine( );
    public IScriptBreakpoint getBreakpoint( );
}
public interface IScriptBreakpoint
{
}
public interface IScriptSourceBreakpoint
extends IScriptBreakpoint
{
    String getClassName( );
    int getLine( );
}
public interface IScriptMethodBreakpoint extends
IScriptBreakpoint
{
    String getMethod( );
    String[ ] getParams( );
}
public interface IScriptWatchpoint extends IScriptBreakpoint
{
    IScriptValue getValue( );
    boolean stopOnRead( );
    boolean stopOnWrite( );
}
}
```

Interface Definition 2

```
 * To change template for new interface use
 * Code Style | Class Templates options (Tools | IDE Options).
 */
package weblogic.debugging.comm;
import java.util.List;
import java.io.Serializable;
/**
 * The script controller will be an object that
   interoperates with the scripting languages
 * to bring you script debugging. The way this
   will work is each language engine will have
 * an instance of the <code>IScriptController</code>,
   and the <code>IScriptController</code>
 * will have list of all the <code>
   IDebuggableLanguage</code> interfaces.
 */
public interface IScriptController
{
    public static class LanguageInfo implements Serializable
        {
            public LanguageInfo(String languageName, String[ ]
            languageExtensions, String[ ] languageFilters, String[ ]
contextHolders)
            {
                _languageName = languageName;
                _languageExtensions = languageExtensions;
                _languageFilters = languageFilters;
                _contextHolders = contextHolders;
            }
            public final String    _languageName;
```

```
        public final String[ ] _languageExtensions;
        public final String[ ] _languageFilters;
        public final String[ ] _contextHolders;
        transient public IDbuggableLanguage _lang;
}
static int RESUME_CONTINUE = 0;
static int RESUME_STEP_IN = 1;
static int RESUME_STEP_OUT = 2;
static int RESUME_STEP_OVER = 3;
static int RESUME_STOP = 4;
/**
 * returns a list that contains LanguageInfo. There will
 * be one for each language.
 */
LanguageInfo[ ] getLanguages( );
/**
 * This is what a running script will call when
   it wants to break. This is a waiting call,
 * that will not return until the thread has been
   told to continue. The frames parameter should
 * be a list of <code>IDebuggable
   Language$IScriptFrame</code>.
 *
 * @param frames - should be the frame list
   for the current script context.
 *
 * @return the return value tells the scripting engine
   what command resumed the break.
 */
public intBreak( );
/**
 * this is what the scripting lanuguage calls when
   it's time to pause itself.
 *
 * @return the return value tells the scripting engine
   what command resumed the pause.
 */
public int Pause(int pauseID);
/**
 * This is what a script engine must call when
   starting execution. This is how the
 * engine will know if the thread is currently
   in the middle of a step or not.
 *
 * @return the return value tells the scripting
   engine what kind of execution we are
 * in the middle of.
 */
public boolean StartScript( );
/**
 * This is what a script engine must call when
   resuming execution. This is how the
 * engine will know if the thread is currently
   in the middle of a step or not.
 *
 * @return the return value tells the scripting
   engine what kind of execution we are
 * in the middle of.
 */
public boolean ResumeScript( );
/**
 * processes an IScriptValue by passingit off to
   the script engine that knows about it, then it
 * will return a new IScritpValue that knows
   more about that value.
 */
public IDebuggableLanguage.IScriptValue
processScriptValue(IDebuggableLanguage.IScriptValue value);
/**
 * This tells the script controller that a breakpoint
   that was previously un-resolvable has
 * now been resolved.
 */
public void breakpointProcessed(IDebuggableLanguage.
IBreakpointInfo bpi);
/**
 * This gets the stack frames for the script language
   specified, using the context specified.
 *
 * @param langExt -- This is the language
   extension for the language we are inspecting.
 * @param context -- This is the language
   context we are investigating.
 *
 * @return an array of the stackframes this yeilds.
 */
IDebuggableLanguage.IScriptFrame[ ]
  getStack(String langExt,Object context);
}
package weblogic.debugging.comm;
/**
 * This interface is used to get a context object
   for a given frame. The way this
 * will work is that the Proxy will go down
   the stack frame, looking for objects that
 * derive from IScriptContextHolder. When
   it comes across such a class, it will get the
 * context from the frame and pass it to the
   DebugScriptController. It is possible for
 * many script frames to all have the same context.
   In this case, the frame will only
 * get passed to the DebugScriptController once.
 */
public interface IScriptContextHolder
{
    public Object getContextInstance( );
}
package weblogic.debugging.comm;
import java.util.List;
/**
 * A scripting engine must implement this interface
   in order to be able to set itself up
 * to debug in the KNEX framework.
 * NOTE: Kill will work the same way for script
   languages as it does for Java execution. An
 * exception will suddenly be thrown that should
   kill everything. You should be careful,
 * that everywhere in your code, you rethrow
   the exception when you get it instead of get
 * processing it.
 */
public interface IDebuggableLanguage
{
    //These are strings for each features
    public static String EXPRESSION_SUPPORT=
    "weblogic.debugging.comm.expressions";
    public static String SOURCE_BREAKPOINT_SUPPORT=
    "weblogic.debugging.comm.breakpoint";
    public static String METHOD_BREAKPOINT_SUPPORT=
    "weblogic.debugging.comm.methodbreakpoint";
    public static String WATCH_POINT_SUPPORT=
    "weblogic.debugging.comm.watchpoint";
    public static int INVALID_PAUSEID = -1;
    /**
     * This will be called when we are ending.
       Problem is that this will not
     * get called in the case of system crashes, etc.
     */
    public void exit( );
    /**
     * This is a list of the classes we should
       filter to prevent from showing up
     * in the stack. You will be able to use
       wild cards, such as org.mozilla.rhino.*
     */
    String[ ] LanguageFilters( );
    /**
     * This is a list of the class instances that
       we can get a script context from.
     */
    String[ ] ContextHolders( );
    /**
     * This is a list of the class instances that we
       can call into to get variable information, etc.
     * When walking through a stack trace, we will go to
       each of these to ask it to spit out it's stack. We will
     * furthermore. When a user inspects this part of the stack,
       we will also ask these objects for variable values, etc.
     */
```

```
String LanguageName( );
/**
 * This is a list of the class instances that we
 can call into to get variable information, etc.
 * When walking through a stack trace, we will go to
 each of these to ask it to spit out it's stack. We will
 * furthermore. When a user inspects this part of the stack, we
 will also ask these objects for variable values, etc.
 */
String[ ] LanguageExtensions( );
/**
 * This function is used for determining what features this debug
 engine supports. (UNDONE what features should
we
    * allow to be disabled)
    */
boolean featureEnabled(String feature);
/**
 * When pause is called, it is up to the script
 engine to break at the next possible
 * place. This method can be called while
 the engine is in teh middle of processing,
 * so should be treated as a synchronized.
 *
 * @returns a boolean stating whether the scripting
 engine has more work to do in order to pause.
 * if this returns true, the Proxy will resume the thread,
 and wait for it to send a message
 * saying it's done. If this returns false, the thread
 will be suspended as is.
 */
boolean pause(Object context, int pauseID);
//
//Methods for Inspecting/dealing with variables
IScriptValue getVariable(Object context,
String strVar, int stackFrame);
void setVariable(Object context, String strVar,
IScriptValue value, int stackFrame);
IScriptValue processValue(IScriptValue value);
IScriptValue processExpression(Object context,
String strExpr, int stackFrame);
//Method for inspecting the current stack
IScriptFrame[ ] getStack(Object context);
//Breakpoints
IBreakpointInfo setSourceBreakpoint
(String clazz, int line, int id);
IBreakpointInfo setMethodBreakpoint
(String clazz, String method, String[ ] params, int id);
IBreakpointInfo setWatchpoint(String clazz, String
varName, boolean fStopOnRead, boolean fStopOnWrite, int id);
void clearBreakpoint(int id);
void clearAllBreakpoints( );
//UNDONE(willpugh) -- must add a getAbstractType
back to this, to find out what kind of object we
// are dealing with. For a loosly typed language you caould
imagine having an object that implemented all
// these interfaces.
public interface IScriptValue
{
   static final int SIMPLE_TYPE = 0;
   static final int COMPLEX_TYPE = 1;
   static final int SCRIPT_ARRAY_TYPE = 2;
   static final int OTHER_LANGUAGE_TYPE = 3;
   static final int JAVA_LANGUAGE_TYPE = 4;
   /**
    * This gets the value we should display to the user.
    */
   String getValue( );
   /**
    * If this is a language that supports types, this
    should return the type name of this variable.
    */
   String getTypeName( );
   /**
    * This is the value the user typed in, it's up to
    the script engine to turn this
    * into a value.
    */
   void setValue(String val) throws Exception;
   /**
    * This determines if the variable is a complex type,
    simple type or other languagy type.
    */
   int getAbstractType( );
   /**
    * This determines if this script value is Read Only or not.
    */
   boolean isReadOnly( );
}
public interface ISimpleScriptValue extends IScriptValue
{
    public static final int TYPE_BOOLEAN = 0;
    public static final int TYPE_BYTE = 1;
    public static final int TYPE_CHAR = 2;
    public static final int TYPE_DOUBLE = 3;
    public static final int TYPE_FLOAT = 4;
    public static final int TYPE_INT = 5;
    public static final int TYPE_LONG = 6;
    public static final int TYPE_SHORT = 7;
    public static final int TYPE_STRING = 8;
    public static final int TYPE_NULL = 9;
    public int getPrimitiveType( );
    public boolean getBoolean( );
    public byte getByte( );
    public char getChar( );
    public double getDouble( );
    public float getFloat( );
    public int getInt( );
    public long getLong( );
    public short getShort( );
    public String getString( );
}
public interface IScriptArrayValue extends IScriptValue
{
    int getLength( );
    IScriptValue getElement(int i);
}
public interface IComplexScriptValue extends IScriptValue
{
    /**
     * there can be complex types that do not have children.
     */
    boolean hasChildren( );
    /**
     * if this is a complex type, this will return a list
     of all it's members.
     */
    List getMembers( );
    /**
     * if this is a complex type, this will return a member of it.
     */
    IScriptValue getMember(String name);
    /**
     * if this is a complex type, this will return a member of it.
     */
    void setMember(String name, IScriptValue val)
    throws Exception;
    /**
     * calls a method on the comlex type. If the
     method is a void method, it should
     * return a null. Otherwise, callMethod should
     return a scriptValue representing the
     * returned value.If that value is null, this will be a
     ScriptValue with the value null.
     */
  IScriptValue callMethod(String name,
  IScriptValue[ ] values);
}
public interface IOtherLanguageValue extends IScriptValue
{
    /**
     * script extension for this variable.
     */
    String getScriptExtension( );
    /**
     * gets the underlying value object. The other scripting
     language should be able to figure out
     * what this is to be able to create one of the other
     Script values from this.
     */
```

-continued

```
        Object getValueObject( );
}
public interface IJavaValue extends IScriptValue
{
    /**
     * gets the underlying java object. The proxy will be able
       to disect this and keep values, etc for this.
     */
    Object getValueObject( );
}
public interface IScriptFrame
{
    /**
     * This will get the file extension specifying
       what language this is.
     * If a language supports more than one file
       extension, this will just be one.
     */
    String getLanguageExtension( );
    /**
     * If this returns non-null, this string will be used to display
     * the stack frame to the user.
     */
    String getFunctionName( );
    /**
     * This is the class name that we will derive
       the file from. This will be put through the
     * document resolution process on the ide.
     */
    String getClassName( );
    /**
     * This is the class name that we will derive the
       file from. This will be put through the
     * document resolution process on the ide.
     */
    String getFileName( );
    /**
     * This is the line of execution the current frame is on.
     */
    int getLine( );
    /**
     * This function will return an array of all the values
       visible from the current stack. All the
     * values in the list that are returned will be of type Strong.
       To get a value, you will want
     * to call IDebuggableLanguage.getVariable
     */
```

-continued

```
    List getFrameVariables( );
    /**
     * This function will return an IScriptValue if there is a
       <code>this</code> object, otherwise it
     * will return null.
     */
    IScriptValue getThis( );
}
public interface IBreakpointInfo
{
    public static final String BREAKPOINT_RESOLVED = "0";
    public static final String BREAKPOINT_
      UNRESOLVED = "1";
    public static final String BREAKPOINT_ERROR = "2";
    public String getStatus( );
    public int getOrigLine( );
    public int CurrLine( );
    public int getId( );
}
}
```

Network Messages

As has already been discussed, some embodiments use facilities in the runtime-messaging environment to perform debugging operations on network messages. This capability is demonstrated here by example shown in the table below developed using the JAVA™ language. In another embodiment, method calls may be made via the native debugging infrastructure JDI. Methods are called on the ScriptController via JDI to do continues and other such tasks. Breakpoints are executed by hitting actual Java breakpoint and are then translated in the proxy to script breakpoint. Thus, breakpoints reduce to java breakpoints. JDI sends a message to the proxy in the underlying JDI protocol. For example, a packet may be sent from the server to the proxy that includes meta-data for a scripting language. The meta-data is used to determine whether to treat the language as a scripting language or to treat the language as a native language. It will be understood that the invention is equally applicable to any programming language. This example is presented for illustrative purposes only and is not meant to limit the scope, functionality or spirit of any particular embodiment of the invention.

| Message | Sender | Meaning | Parameters |
| --- | --- | --- | --- |
| SetBreakpoint | Proxy | Trying to set a script breakpoint. | File - File name<br>Line - Line number<br>Language Ext - Language Extension |
| SetMethodBreakpoint | Proxy | Trying to set a breakpoint on a method | Class - Class name (or file name is language doesn't have classes)<br>Method -- Name of the method to set a breakpoint on<br>Parameters - The parameters for the method to set a breakpoint on. This disambiguates in the case of multiple methods with the same name but different parameters<br>Language Ext - Language Extensions |
| BreakpointSet | Runtime-messaging environment | Breakpoint is set | Status - Did the breakpoint get set<br>Error -- Error message if it failed |
| BreakHit | Runtime-messaging environment | A Script hit a breakpoint | File - the file name<br>Line - the line number |
| Continue | Proxy | A script should resume | ContinueType - whether this should continue with a step or a continue |

| Message | Sender | Meaning | Parameters |
|---|---|---|---|
| Pause | Runtime-messaging environment | Tells the proxy a script has gotten to a safe place and paused | PauseID - This is the ID we use to map a pause the thread it was requested on. |

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A non-transitory computer-readable storage medium, with instructions stored thereon for debugging in more than one programming language with a multi-language debugger, comprising:
   instructions for performing debugging of a source code file which contains multiple nested languages;
   instructions for interpreting multiple nested languages within a single source file and displaying each of the multiple nested languages in a script context of a debugging frame, wherein the debugging frame uses a script engine that holds the script context;
   instructions for generating a script debug controller that receives information comprising language extensions for each language, classes that implement the script engine, information on optional capabilities for each language, and a language name;
   instructions for editing for each language in the debugging frame; and wherein the multi-language debugger uses a standardized interface for the script engine and all communications with the script engine are through calls to the script debug controller.

2. The computer-readable storage medium of claim 1, wherein the multi-language debugger is extensible and a user adds language definitions to support additional languages.

3. The computer-readable storage medium of claim 1, wherein when more than one language appears on a stack, a user sees a debuggable frame for each language and the user inspects variables for each language.

4. The computer-readable storage medium of claim 1, wherein a proxy is used between executing code being debugged and a debugger.

5. The computer-readable storage medium of claim 1, wherein a script engine interface is used by a debugger to communicate metadata to a proxy.

6. The computer-readable storage medium of claim 1, wherein a debugger interacts with a runtime messaging environment.

7. The computer-readable storage medium of claim 1, wherein debugging is performed on a server side of a runtime messaging environment.

8. The computer-readable storage medium of claim 1, wherein a runtime messaging environment interprets language interactions and performs debugging.

9. The computer-readable storage medium of claim 1, wherein the script engine has a static constructor load the script debug controller.

10. A system for debugging in more than one programming language, the system comprising:
    a memory;
    at least one processor coupled with the memory operative for debugging;
    a multi-language debugger configured to debug a source code file which contains multiple nested languages, wherein the multi-language debugger is further configured to interpret multiple nested languages within a single source file and display each of the multiple nested languages in a script context of a debugging frame;
    a script engine that holds said script context in the debugging frame; and
    a script debug controller that receives information comprising language extensions for each language, classes that implement the script engine, information on optional capabilities for each language, and a language name, wherein each language is edited in the debugging frame, and wherein the multi-language debugger uses a standardized interface for the script engine, and all communications with the script engine are through calls to the script debug controller.

11. The system of claim 10, wherein the multi-language debugger is extensible and a user adds language definitions to support additional languages.

12. The system of claim 10, wherein when more than one language appears on a stack, a user sees a debuggable frame for each language and the user inspects variables for each language.

13. The system of claim 10, wherein a proxy is used between executing code being debugged and the multi-language debugger.

14. The system of claim 10, wherein a script engine interface is used by a debugger to communicate metadata to a proxy.

15. The system of claim 10, wherein a debugger interacts with a runtime messaging environment.

16. The system of claim 10, wherein debugging is performed on a server side of a runtime messaging environment.

17. The system of claim 10, wherein a runtime messaging environment interprets language interactions and performs debugging.

18. The system of claim 10, wherein the script engine has a static constructor load the script debug controller.

* * * * *